(12) United States Patent
Jacobs

(10) Patent No.: US 10,729,153 B2
(45) Date of Patent: *Aug. 4, 2020

(54) APPARATUS FOR BREWING COFFEE AND OTHER BREWED BEVERAGES USING THE PROCESS OF INFUSION AND AGITATION

(71) Applicant: Robert David Jacobs, Franklin, NY (US)

(72) Inventor: Robert David Jacobs, Franklin, NY (US)

(*) Notice: Subject to any disclaimer, the term of this patent is extended or adjusted under 35 U.S.C. 154(b) by 260 days.

This patent is subject to a terminal disclaimer.

(21) Appl. No.: 15/806,692

(22) Filed: Nov. 8, 2017

(65) Prior Publication Data

US 2019/0059412 A1 Feb. 28, 2019

Related U.S. Application Data

(63) Continuation-in-part of application No. 15/688,058, filed on Aug. 28, 2017.

(51) Int. Cl.
*A23F 5/26* (2006.01)
*A47J 31/20* (2006.01)
(Continued)

(52) U.S. Cl.
CPC ............ *A23F 5/26* (2013.01); *A23F 5/262* (2013.01); *A47J 31/0689* (2013.01); *A47J 31/20* (2013.01); *A47J 31/4403* (2013.01); *A47J 31/52* (2013.01)

(58) Field of Classification Search
CPC ......... A23F 5/26; A23F 5/262; A47J 31/0689; A47J 31/20; A47J 31/4403; A47J 31/52
See application file for complete search history.

(56) References Cited

U.S. PATENT DOCUMENTS 1,602,632 A * 10/1926 Zorn .................... A23F 5/26
210/210
2,304,004 A 12/1942 Low
(Continued)

FOREIGN PATENT DOCUMENTS

DE 4317902 A1 12/1994
GB 509740 A 7/1939

OTHER PUBLICATIONS

Related U.S. Appl. No. 15/688,058 Non-Final Office Action dated Nov. 15, 2019, 17 pages.
(Continued)

*Primary Examiner* — Anthony J Weier
(74) *Attorney, Agent, or Firm* — Hoffman Warnick LLC

(57) ABSTRACT

An apparatus and method for brewing coffee of higher quality and better taste than any apparatus and method currently available, while also enabling users to utilize less coffee grounds per brewing cycle, thereby achieving significant cost savings for users. A basket that houses a packet of coffee grounds is housed within a carafe that stores water. The basket is fabricated so that water may enter therein and exit therefrom, and the packet of coffee grounds enables water and natural coffee oils to penetrate the packet, but does not allow coffee grounds to escape the packet. The carafe is filled with water that is gradually heated from at or around tap temperature to approximately boiling. While the water in the chamber is heated, the basket is agitated. This causes the gradually heating water to enter the basket and agitate the packet, thereby extracting natural coffee oil from the grounds stored within the packet, which creates brewed coffee. The entire brewing process may be controlled by electronic controlling means.

12 Claims, 10 Drawing Sheets

(51) Int. Cl.
*A47J 31/44* (2006.01)
*A47J 31/06* (2006.01)
*A47J 31/52* (2006.01)

(56) References Cited

U.S. PATENT DOCUMENTS

| | | | | |
|---|---|---|---|---|
| 2,631,522 A * | 3/1953 | Joy | ......... | A47J 31/20 99/287 |
| 2,858,762 A * | 11/1958 | Wade | ......... | A47J 31/20 99/287 |
| 3,020,823 A * | 2/1962 | Musso | ......... | A47J 31/20 99/287 |
| 3,023,691 A * | 3/1962 | Turner | ......... | A47J 31/22 99/287 |
| 3,654,852 A * | 4/1972 | Rosan, Sr. | ......... | A47J 31/20 99/323 |
| 4,401,014 A * | 8/1983 | McGrail | ......... | A47J 31/20 99/283 |
| 5,676,041 A * | 10/1997 | Glucksman | ......... | A47J 31/402 99/286 |
| 5,957,035 A * | 9/1999 | Richter | ......... | A23F 5/26 426/433 |
| 6,085,638 A * | 7/2000 | Mork | ......... | A47J 31/22 392/480 |
| 2002/0121197 A1 | 9/2002 | Mercier et al. | | |
| 2003/0202787 A1* | 10/2003 | Wu | ......... | A47J 31/545 392/467 |
| 2007/0278202 A1* | 12/2007 | Long | ......... | A47J 31/20 219/214 |
| 2013/0055901 A1* | 3/2013 | Zhang | ......... | A47J 31/20 99/279 |
| 2019/0059634 A1* | 2/2019 | Jacobs | ......... | A47J 31/0689 |

OTHER PUBLICATIONS

Related U.S. Appl. No. 15/688,058 Notice of Allowance and Fees Due dated Apr. 28, 2020, 8 pages.

* cited by examiner

Figure 8
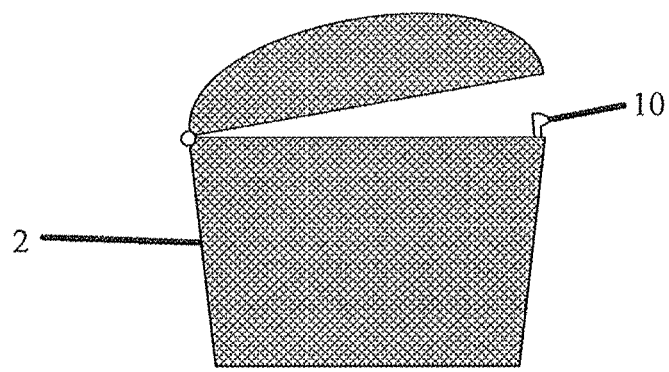
Figure 8a
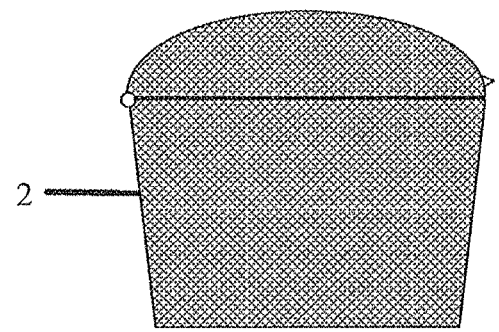
Figure 8b

Figure 9
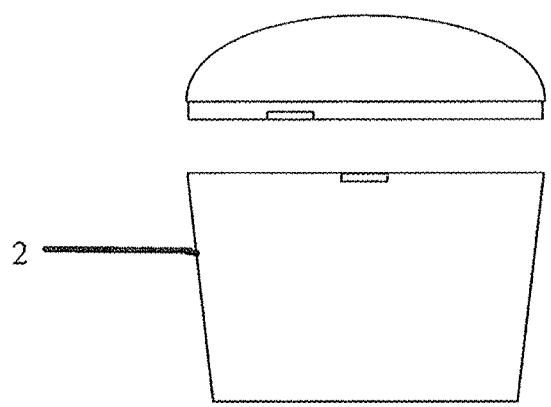
Figure9a
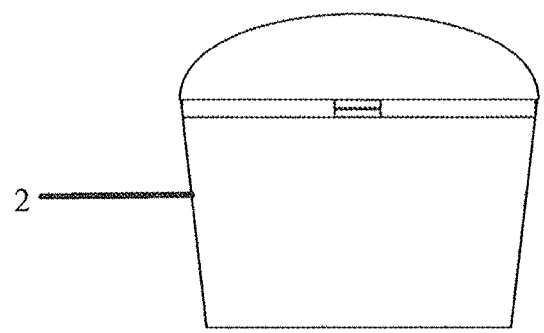
Figure9b

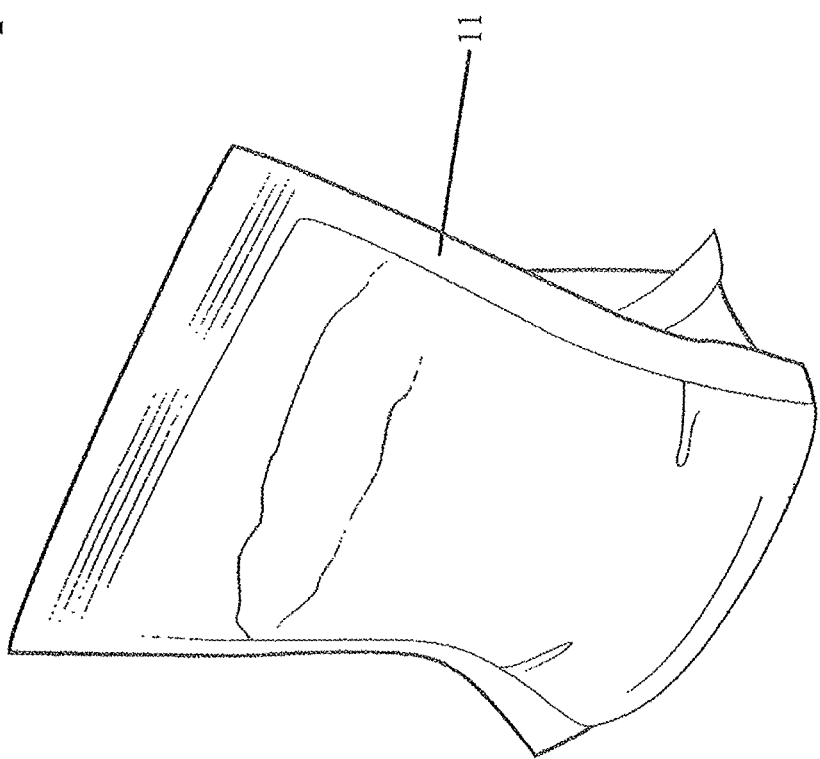

APPARATUS FOR BREWING COFFEE AND OTHER BREWED BEVERAGES USING THE PROCESS OF INFUSION AND AGITATION

PRIORITY CLAIM

This application claims priority to U.S. application Ser. No. 15/688,058, filed Aug. 28, 2017.

FIELD OF THE INVENTION

The invention relates to brewing coffee and other beverages and, more specifically, to providing an apparatus and method for brewing coffee that is more efficient than the coffee brewing systems of the prior art and that produces a higher quality coffee than can be produced by the coffee brewing systems that the industry currently offers.

BACKGROUND OF THE INVENTION

Coffee's Ubiquity & Availability

Coffee is one of the most popular drinks in America. A 2015 Gallup poll found that nearly two-thirds (64%) of Americans drink at least one cup of coffee per day. See http://www.gallup.com/poll/184388/americans-coffee-consumption-steady-few-cut-back.aspx. More telling, the same poll found that the average coffee drinker in America drinks nearly three full cups of coffee each and every day. Id.

Given coffee's wild popularity across the country, it is not surprising that coffee drinkers have more options for obtaining a cup of coffee than ever before. Today, coffee drinkers can purchase a cup of coffee at name-brand commercial coffee shops, like Starbucks and Dunkin Donuts; gas stations; street vendors; at fast food locations, such as McDonald's (as well as at almost any food serving establishment); and at numerous other locations (all locations at which a coffee drinker may purchase coffee outside of their home are collectively referred to hereafter as "coffee shops"). And research suggests that coffee drinkers indeed swarm coffee shops. Trade magazines report that the average Starbucks serves over 500 customers each day and Dunkin Donuts reports that is sells nearly 2 billion cups of coffee in America each year. http://www.businessinsider.com/how-many-customers-starbucks-will-have-2013-10; https://news.dunkindonuts.com/news/brand-keys-names-dunkin-donuts.

Despite the ubiquity of coffee shops, the overwhelming majority of American coffee drinkers still make their coffee at home. See, e.g., https://www.aol.com/2011/01/25/savings-experiment-the-perks-of-brewing-versus-buying-coffee/. Making coffee at home offers numerous advantages. The most notable advantage is cost: making coffee at home is drastically cheaper than buying it at coffee shops. The average cost of a cup of coffee that is purchased on-the-go ranges between $2-$5. The average cup of coffee brewed at home, however, costs on average only 16 to 22 cents depending on how much you spend per pound to buy the coffee. For example, at $8 per pound (a common price for many types of coffee in typical US grocery stores), the average 10 cup per day user spends $0.20 per cup. Not surprisingly, numerous publications that advise consumers about how to increase their savings counsel consumers to make coffee at home rather than paying the comparatively high prices charged by coffee shops.

But there is a significant drawback that at-home coffee drinkers must face: poor quality and taste (this can also be a significant problem at coffee shops). Many people believe that the beans that a person uses will dictate the quality and taste of coffee brewed at home. But while bean quality is certainly a factor that impacts taste, the factor that most overwhelmingly influences the quality and taste of coffee is the method of brewing.

The Science of Making Coffee

Humans have been brewing and drinking coffee for more than 500 years. But over that time, the science of making coffee has not changed significantly. When coffee is "brewed," technically what the user is doing is using hot water to extract natural oil from coffee beans. This oil infuses with the hot water used to extract the oil, and the resultant oil-water mixture is what we refer to as "brewed coffee." (Although "cold brewing" has become popular in recent years, cold brewing coffee involves a wholly different brewing process than is used for brewing hot coffee).

As explained further below, the invention disclosed herein utilizes a process known as "agitated infusion" that is not utilized by any coffee brewing system that is currently available (other than US application No., to which this application claims priority). Agitated infusion is the process of immersing coffee grounds in water that is at or about tap temperature, gradually heating the water to approximately boiling, and agitating the grounds within the water while it is heated to approximately boiling. This gradual raising of the water temperature to near 212 degrees, combined with agitation of the grounds that are fully immersed in the gradually heating water (as explained herein), achieves the maximum extraction of oil from the coffee grounds, which results in two significant advantages: (i) the brewed coffee that is produced is richer in flavor: and (ii) because the infusion process extracts significantly more oil from the coffee grounds than other coffee brewing processes, the user is able to achieve a richer tasting brewed coffee using less coffee grounds, which is more efficient and results in the user saving significant amounts of money. Any variation from the agitation infusion method, such as using water heated to a lower temperature or failing to utilize the gradual heating process and agitation (or any other variation), will result in the brewing process being unable to extract the very high percentage of oil from the grounds that can be extracted using agitated infusion. Failing to fully submerge the grounds in the water during the agitating and heating process, as provided during agitated infusion, will significantly diminish the quality of the brewed coffee.

The industry's most relevant and widely utilized methods of brewing coffee, none of which utilize the agitation infusion process as present invention does, are discussed below.

Turkish Coffee

Turkish coffee is among the oldest methods of brewing coffee and the process of making Turkish coffee is well known. For a good example of the prior art's discussion of Turkish coffee, see WO2007116350 A1 (Suleyman, et al). In short, to make Turkish coffee, the user places water into a carafe (or other receptacle) and places the carafe over heat (such as the flame of a stove or, in past times, the flame of a fire). Then the user heats the water to a medium-high temperature. Once the water reaches that medium-high temperature, the user adds finely ground coffee to the carafe. The user then stirs the coffee within the carafe and allows the water with the coffee therein to continue to heat; this process extracts the oil from the coffee so that the oil begins to mix with the water, which forms brewed coffee. Once the coffee grounds begin to sink, the user stirs the coffee-water mixture again; this stirring extracts even more oil from the coffee grounds and creates a consistent brewed coffee. As the user stirs, the coffee-water mixture should begin to foam up.

Once the coffee-water mixture begins to foam, the user stops stirring and removes the coffee-water mixture from heat. After a short time (approximately 30 seconds), the coffee grounds will settle to the bottom of the carafe and the brewed coffee mixture can be carefully poured into cups and served.

French Press

Among widely utilized coffee makers, French Press systems are generally considered to produce the best tasting coffee. In nearly every survey taken of coffee drinkers, the French Press is thought to be the best brewing method. Not surprisingly, many exclusive restaurants use only the French Press method.

A typical example of the French Press process of brewing coffee is disclosed in U.S. Pat. No. 6,422,133 B1 to Brady. Like making Turkish coffee, a French Press system works by immersing ground coffee (freshly ground coffee is preferred, but not necessary) directly into water—but the remainder of the process is different. In a French Press system, the user pours coffee grounds into the empty French Press carafe. After doing so, the user adds water that has been heated to approximately 212 degrees. The hot water will begin extracting oil from the coffee grounds to form brewed coffee. At this point, some French Press users will stir the grounds within the water in an effort to extract additional oil from the grounds, others do not stir. Whether the grounds are stirred or not, after the water is added the user must wait 3-6 minutes. During this time, the hot water will continue extracting oil from the coffee grounds to create a more robust brewed coffee, but the temperature of the water will decrease quickly and the process of extracting oil will be weakened as the temperature falls. After these 3-6 minutes pass, the user slowly lowers the French Press "plunger" from the top of the carafe to bottom. The head of the plunger is usually designed similar to a "screen," which permits the brewed coffee to pass through while forcing the now used coffee grounds to the bottom of the carafe. Once the brewed coffee is separated from the grounds, the user can pour the coffee out of the carafe and into a mug.

Pour Over

The "pour over" method of brewing coffee is often also lauded as producing high quality coffee. Most often associated with the brand Chemex®, the pour over method involves the steps of heating water to boiling, placing ground coffee within a filter and positioning the filer above a receptacle capable of storing brewed coffee, removing the boiling water from the heat source and pouring it over the coffee grounds so that the water flows through the grounds and into the receptacle. Most pour over users utilize a specific method of pouring the water over the coffee, which may include multiple pouring steps, in an effort to extract the maximum amount of oil from the grounds.

Drip Brewing Systems

There is no doubt that the most utilized coffee brewing system today is the "drip"; drip coffee makers have been a mainstay in the majority of American homes for decades. The standard drip system is described in U.S. Pat. No. 5,001,969 to Moore, et al and brews coffee by spraying hot water over coffee grounds that are held in a filtered basket situated above a carafe. The sprayed hot water trickles downward through the grounds and as it does so the hot water extracts and mixes with the oil from the coffee grounds. There is an opening in the bottom of the basket that houses the filtered coffee grounds. When the water trickling downward through the basket reaches the bottom (and by this time has extracted and mixed with oil from the coffee grounds), the now-formed brewed coffee exits the basket through a hole in the basket's bottom and empties (i.e., drips) into a carafe (or other storage receptacle) that stores the coffee until the user transfers it into a mug for drinking. The storage receptacle usually includes a means for keeping the receptacle and brewed coffee heated. For standard drip systems that utilize a carafe for storing the coffee, the carafe often rests atop a hot plate that keeps the brewed coffee warm.

There are many variations of drip systems designed to suit user preferences and to enhance the quality of the coffee that drip makers brew. For example, U.S. Pat. No. 5,001,969 discloses a drip system that includes timers to permit and regulate automatic brewing cycles that allow the system to brew coffee even when the user is not present. U.S. Pat. No. 4,406,217 to Oota discloses a drip system that includes a mill to grind coffee immediately prior to brewing, the idea being that freshly ground coffee will produce more flavorful coffee. Other variations of drip systems maintain a reservoir of hot water that can be immediately sprayed over the coffee grounds so that the user does not have to wait for water to be heated or an internal "tank" where the brewed coffee is stored, as opposed to a carafe, and the user opens a spigot (or performs a similar function) and the coffee-water mixture drains from the "tank" into the user's mug. This saves the user the trouble of washing a carafe. Despite how drip system may be varied or the "bells and whistles" that may be included for user preference, the majority of drip systems still employ the same process to brew coffee: spraying heated water over coffee grounds, with the water eventually draining into a receptacle from which the coffee is then transferred to the user's mug.

There are, however, a minority one drip system that utilizes a form agitation to brew higher quality coffee. For example, U.S. Pat. No. 6,532,862 to Mork, et al discloses a drip system that utilizes a spinning basket to create centrifugal forces to more thoroughly infuse the coffee grounds with water. Mork also notes additional prior art that utilizes centrifugal forces to more thoroughly infuse the coffee grounds, such as U.S. Pat. No. 5,265,617 to Gilbert and U.S. Pat. No. 1,602,632 to Zorn. Cuisinart has also recently release its DCB-10 Automatic Cold Brewing System, which uses agitation to "cold brew" coffee at a pace that, the company claims, can produce quality cold brew coffee in less than one hour. Because cold brewing uses water that is not heated, the process usually requires far longer to brew coffee than is required to brew hot coffee because cooler water less able to extract oil from coffee than hot water. For example, many cold brew coffees are brewed for several hours or even overnight. The Cuisinart DCB-10 system claims that, through its agitation process, it can brew quality cold brew coffee in less than one hour. As explained further below, even these systems that utilize agitation and infusion do so in a manner unlike and inferior to the invention disclosed herein.

Single-Cup Coffee Brewers

Single-cup coffee makers, such as the Keurig brewing system that is covered by numerous US patents, including U.S. Pat. Nos. 7,398,726; 7,165,488; 7,347,138; D513,572; 7,377,162; D544,299; 7,360,418; 7,513,192; 8,151,694, have over the last several years become extremely popular because of their convenience and speed. Rather than requiring the user to place coffee grounds in a basket or directly into water within a carafe, single-cup coffee makers use coffee "pods" (these coffee pods are commonly referred to as "K-cups"). The coffee pods are a single-use, premeasured and prepackaged amount of coffee grounds that may be used to brew a single cup of coffee (as opposed to multiple cups of coffee, which can be brewed using the Turkish, French Press, and drip systems discussed above). Single-cup coffee makers heat water to approximately 192 degrees before it inundates the grounds. To initiate the brewing process, a user opens the system's coffee pod chamber and places a pod into the chamber. Next, the user closes the chamber. The chamber is designed so that by closing the chamber with a coffee pod therein, the chamber's structure will pierce the upper portion of the coffee pod from above and pierce the lower portion of the coffee pod from below.

Once the chamber is closed, the user can begin the coffee brewing process, which is usually done simply by pressing a "start" button. This causes the system to pump heated water into the chamber. When the water enters the chamber, it enters the coffee pod via the opening in the pod's upper portion that was created when the chamber closed. Once the water enters the pod, it inundates the coffee grounds contained therein, which extracts and mixes with oil from the grounds to create brewed coffee. The force of water being pumped into the chamber, as well as gravity, force the brewed coffee to flow out of the opening in the bottom of the pod, which is situated above an opening in the bottom of the chamber, and the brewed coffee then flows out of the machine and into the user's mug, which is situated below the opening in the bottom of the chamber.

Percolators

The modern iteration of a percolator coffee maker was patented in 1889 by an Illinois farmer named Hanson Goodrich, see U.S. Pat. No. 408,707 (other iterations of percolators are thought to have been utilized as long ago as 1810). In modern percolators (hereafter "percolators"), which have changed little if at all since Hanson Goodrich, the entire brewing process occurs within a carafe; the design and process is as follows:

The carafe must be fabricated using material that can withstand and transfer high levels of heat; metal is generally preferred;

The carafe has a removable lid;

Toward the top of the inside of the carafe, but not at the top of the carafe, there is a chamber (often made from metal mesh);

The chamber is typically donut-shaped, so that there is an opening in the middle;

Tubing (like a pipe) extends from the opening in the middle of the chamber, downward, toward the bottom of the carafe, but the tubing does not reach or contact the bottom of the carafe;

A user pours a desired amount of water into the carafe;

The user places a desired amount of coffee grounds in the chamber (there are commercially available "packets" of coffee grounds for use in percolators; the packets are typically made of the same material as coffee filters, contain a premeasured amount of coffee grounds, and are often donut-shaped, like the chamber, which can be significant, as explained below);

The user then places the carafe over a heat source, which today is generally the flame (or electric burner) of a kitchen stove;

The user adjusts the heat so that the water within the carafe rises to boiling or approximately boiling;

As the temperature of the water approaches boiling, the water (some of which will transition to a gaseous or semi-gaseous state) travels up the tubing from the bottom of the carafe to the top region of the carafe above the chamber that holds the coffee grounds;

When the water reaches the top region of the carafe, it falls downward due to gravity and any water that has transitioned to a gaseous or semi-gaseous state condenses in the carafe's top region, returning to a liquid state, and falls downward due to gravity;

When the water falls downward, it falls atop the coffee grounds or the packet of coffee grounds that is held in the chamber;

The falling water then trickles through the grounds, extracting oil therefrom;

When the water (which has mixed with the oil extracted from the grounds) reaches the bottom of the chamber, it falls through the chamber's mesh (or otherwise porous bottom), and mixes with the rest of the water that is in the carafe's bottom region.

As long as the heat remains sufficiently high, the water in the percolator constantly cycles from the bottom of the chamber, up the tubing, and downward through the grounds. The more cycles that the user allows, the more robust the coffee will be.

When the user has permitted the percolator to cycle for a desired amount of time, the user removes the carafe from the heat source. A short period of time after the user has removed the carafe from the heat source, the percolator will stop cycling. The user then pours the coffee that is now stored in the bottom of the carafe into a coffee cup and enjoys the coffee.

Shortcomings of Currently Available Coffee Brewing Systems

Unfortunately for consumers, all of the coffee brewing systems currently available are plagued by significant shortcomings that impair the quality of the coffee they produce or make the systems inconvenient for consumers and relatively expensive. A non-exhaustive discussion of significant shortcomings of each system, many of which the present invention seeks to remedy, are explained below.

Turkish Coffee Shortcomings

For most consumers today, the most significant problem of making Turkish coffee is the inconvenience of the brewing process. It is no coincidence that single-cup brewers have exploded in popularity; in today's on-the-go world, putting a pod into the chamber and pressing start is the easiest way to make coffee. In contrast, Turkish coffee requires multiple steps that are comparatively laborious. The user must heat water and then deposit coffee grounds therein. Then the user must continue heating. Not only does this require work from the user, it also requires vigilance. Unlike drip and single-cup systems, where once the brewing process begins the user can simply wait for the coffee to be ready drink, brewing Turkish coffee requires the user to watch over the process from start to finish. Many if not most Americans simply do not have the time in the morning to devote such vigilance to making coffee, as they are preparing for work; preparing children to go to school; assisting spouses with their morning preparations; or caring for pets—for many Americans, each morning involves a combination of these tasks.

Aside from inconvenience, Turkish coffee also inheres several systemic problems for consumers. For example, if the consumer is not vigilant in the water heating process the grounds can remain in boiling water for too long of a time resulting denatured coffee which can be very bitter Another potential problem is that consumers will pour the brewed coffee from the carafe before the coffee grounds have fully settled, which results in consumers drinking coffee grounds, which is undesirable. Still another problem is clean up. Once the brewing process is complete, the user is left with a carafe full of wet, used coffee grounds that must be discarded and the carafe must be cleaned before it may be used to make more coffee.

As far as taste, the principal problem with Turkish Coffee is that the water used to extra oil from the grounds is generally heated to a medium-hot temperature before the grounds are added or is heated for too long. As explained further, infra, an important aspect of the agitated infusion process disclosed herein is the gradual raising of water temperature while coffee grounds are immersed therein. By beginning the brewing process with water heated to a medium temperature (as opposed to the near boiling temperature water that many of the other brewing processes discussed herein utilize), Turkish coffee does, more than any other method of brewing coffee available to consumers to date, utilize the infusion process—but only to a relatively minor degree as compared to the present invention.

French Press Shortcomings

French Press systems suffer from the same convenience problems that plague Turkish coffee: the user must manually heat water, add grounds, and remain vigilant until the process is complete, and cleanup is inconvenient. In addition, most French press carafes are much smaller than drip system carafes. Because the size of the carafe is smaller, and the work and time involved to brew French Press coffee, if a person has house guests (or otherwise needs to make coffee for more than one or two people), a French press system will generally be undesirable. Also French Press coffee makers do not have heating elements to keep the brewed coffee hot.

French Press systems also fail to take advantage of the infusion process. As noted above, when a user pours preheated water into the French Press carafe, the water is already heated to approximately 200+ degrees. Although infusing the grounds in water heated to 200+ degrees will extract more oil than lower temperature coffee brewing methods (such as drip systems and single-cup systems, see infra), failing to employ the infusion process that involves gradually raising the water's temperature and constant agitation means French Press systems will not extract the maximum amount of oil from the grounds, which means the brewed coffee will not be as robust in flavor as it could be. In addition, the water used to brew coffee using a French Press begins to immediately cool once it is removed from the heat source, which further reduces the ability of French Press systems to extract maximum oil from the coffee grounds.

Pour Over Shortcomings

The pour over method suffers shortcomings inherent to both the Turkish method and French Press systems. For one, the user has to undergo the inconvenient process of separately heating water before coffee can be made. Second, the heated water begins to cool as soon as it is removed from the heat, reducing the pour over method's ability to extract oil from the grounds. In addition (and again like French Press), many pour over carafes hold a smaller volume of coffee and lack a heating element (although some pour over carafes are specifically designed so that they may be placed on top of a stove to keep the coffee warm, but this remains a far cry from the heating elements included in some systems, such as those included in many drips).

The pour over method also lacks true agitation. The coffee grounds merely sit stationary in the filter while water is poured over them. And even altering the pouring method does not result in true agitation or immersion.

Drip System Shortcomings

Most drip systems inheres a host of shortcomings. First, the water temperature of most standard drip coffee makers is heated no higher than 170 degrees before it is sprayed over the coffee grounds. This poses two problems. First, by merely preheating water to 170 degrees and spraying it over grounds, drip systems fail to in any way take advantage of the infusion process. Second, water that is heated to 170 degrees is not hot enough to extract anywhere close to the maximum amount of oil from the coffee. To extract the maximum amount of oil, the water temperature must reach approximately boiling. Further, the water begins to cool quickly after being sprayed on to the grounds, which further impairs the ability of most drip systems to extract oil from the grounds.

The second major problem with most drip coffee makers is the process by which they extract the coffee oil. To extract the maximum amount of oil, coffee grounds should be immersed in water and agitated. But most drip systems simply spray hot water on to grounds, which is referred to as "washing" the grounds. When grounds are merely washed in a drip system, the water sometimes only washes the grounds directly below or very close to the nozzle from which the water is sprayed (many drip coffee makers have numerous nozzles). As a result, there are instances when only a fraction of the coffee grounds are fully washed. This means that oil is extracted from only a fraction of the grounds and the coffee brewed therefrom is only a fraction as flavorful as it would be if all of the grounds were completely washed. Besides dampening the coffee's flavor, the inability of most drip systems to extract oil from all of the coffee grounds means that consumers are wasting large amounts of money on coffee grounds that are never actually used to brew coffee. For consumers that buy high quality beans, the day-in, day-out waste of "unused" grounds can equate to a significant amount of wasted income. So in sum, drip brewers force consumers to overspend to brew coffee that has a dampened flavor.

As noted above, a minority of drip systems incorporate a process by which centrifugal force circulates water through the grounds. While this may be an improvement over the spraying and washing method, it is still less effective at extracting oil than the agitation and infusion method disclosed herein. In addition, the centrifugal processes do not employ the gradual heating process disclosed herein; the water in those systems is heated prior to circulating through the grounds. See, e.g., U.S. Pat. No. 6,532,862 to Mork.

Single-Cup System Shortcomings

As noted above, single-cup brewing systems inundate the grounds in the pods with water that is preheated to 192 degrees. While water heated to 192 degree will extract more oil from the grounds than water heated to 178 degrees, 192 degrees is still below the ideal approximately boiling temperature. And like other methods of brewing coffee, because the water is pre-heated to 192 degrees before inundating the grounds, single-cup brewing systems fail to utilize the gradual heating that is involved in the infusion process.

And, of course, single-cup systems only brew a single cup of coffee at a time. While this is often convenient, if a person has house guests or needs to make coffee for many, reliance solely on a single-cup system can be inconvenient. Finally, single-cup systems are generally considered bad for the environment because their use generates millions of used plastic pods that must be discarded.

Percolator Shortcomings

Like the French Press and pour over, percolator systems require significantly more time, effort, and vigilance than most coffee drinkers are willing to expend. The heat employed to cause the water to rise through the tubing must be monitored, as must the length of time that the user allows the percolator to cycle, because permitting the water within the percolator to reach too high a heat or to heat for too long may result in the coffee oils breaking down, which results in poor taste. In addition, if a user does not use packets of coffee in the percolator, but instead adds coarse-ground coffee grounds directly to the chamber (which is commonly done), there is a high likelihood that some of the coffee grounds will fall through the openings in the chamber's bottom. This will ultimately result in the grounds being in the coffee when the user drinks it, which is undesirable Percolators also fail to employ any aspect of agitated infusion. Like a drip system, water merely trickles down through and washes the grounds—it does not inundate the grounds. Further, there is no agitation; the grounds merely sit in the chamber while being washed.

SUMMARY OF THE INVENTION

The present invention provides an apparatus and method for brewing coffee (and other brewed beverages, such as tea) that that fully employs the infusion process and agitation, which extracts the maximum amount of oil from coffee grounds in order to produce a brewed coffee of the highest quality and taste. The apparatus includes a carafe, similar to (or identical to) the type of carafe used in percolator systems. However the interior components of the present invention differ significantly from percolator systems.

Unlike a percolator system, the present invention includes a basket for holding coffee grounds near the bottom of the carafe. The basket is able to hold a packet of coffee grounds during the brewing process (similar to the packet of coffee grounds that may be used in percolator systems), and the basket also enables water to enter the basket and exit the basket, so that as water enters and exits the basket the water inundates the coffee grounds stored in the packet that is held within the basket. The apparatus also includes a means for agitating the basket while the brewing process occurs.

Once the user places a packet of coffee grounds into the basket and adds water at approximately tap temperature to the carafe (ideally the water level should be such that the coffee grounds are fully submerged), the user may use the apparatus to perform the method of brewing coffee disclosed herein, such method includes: the user applying an external heat source to the carafe so that the water begins to heat; at the same time the user applies such external heat source, the user initiates the means for agitating the basket; the user then allows the heat source to raise the temperature of the water within the carafe from tap temperature to approximately boiling; the means for agitating the basket continues agitating the basket, which agitates the packet stored therein, during the time that the heat source raises the water from tap temperature to approximately boiling. This heating-agitation process lasts approximately 7 minutes. Once it is complete, the brewed coffee may be poured from the carafe and enjoyed by the user. In an alternative embodiment, the carafe may include a means for heating and therefore does not require an external heat source.

This process takes all of the best elements from Turkish and French Press systems, and is significantly more efficient in extracting oil from coffee grounds than any method or system of brewing coffee that is currently available. As a result of this increased efficiency, less grounds are required to brew coffee and users can expect money savings of much as $300.00 per year for a person making 10 cups per day using amounts of coffee recommended by various manufacturers.

BRIEF DESCRIPTION OF THE DRAWINGS

The drawings included herewith are not intended to in any way limit the scope of the invention disclosed herein. The drawings are merely included to clarify and exemplify the invention as disclosed and claimed herein

FIGS. 8a and 8b show how the basket may be opened and closed via a latch.

FIGS. 9a and 9b show how the basket may be opened and closed via a "twist-lock."

FIG. 10 shows the packet in which coffee grounds are stored.

DETAILED DESCRIPTION OF THE INVENTION

The present invention combines all of the best practices (some detailed earlier) for brewing coffee into a single system. But before describing the components of the present invention for brewing coffee, it is important to describe how coffee grounds are used in the present invention.

The Packet

The present invention utilizes coffee grounds that are stored within a "packet." An example of the packet is shown in FIG. 10. The packet 11 resembles an envelope. Packets with pre-measured amounts of coffee will be available for consumers. However, packets will also be available that will permit users to add an amount of coffee that they prefer. It is critical that the packet 11 be manufactured from a material that will permit water and the oil derived from the grounds to pass through the packet's material, but will not allow the grounds to escape the packet. There are numerous types of materials that will allow water and oil to pass through but will keep the coffee grounds from escaping, and those of skill in the art will recognize such materials may be used to manufacture the packet. In a preferred embodiment, the packet is comprised of material similar to or the same as the material that comprises coffee filters commonly used in the art. Suitable materials (some of which are currently used as coffee filters) include bleached paper, bamboo, nylon or even gold.

Brewing System Components

Figure 1:
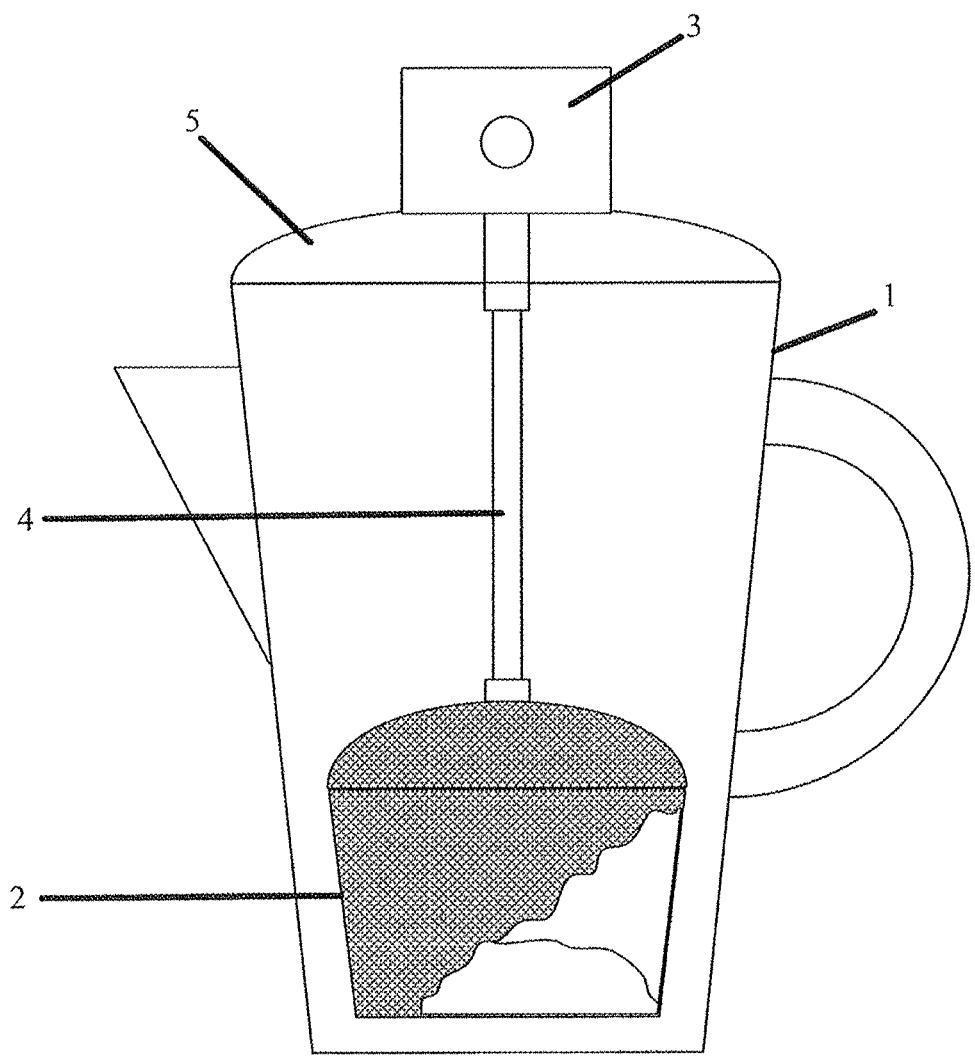
FIG. 1 shows the apparatus.
Figure 2:
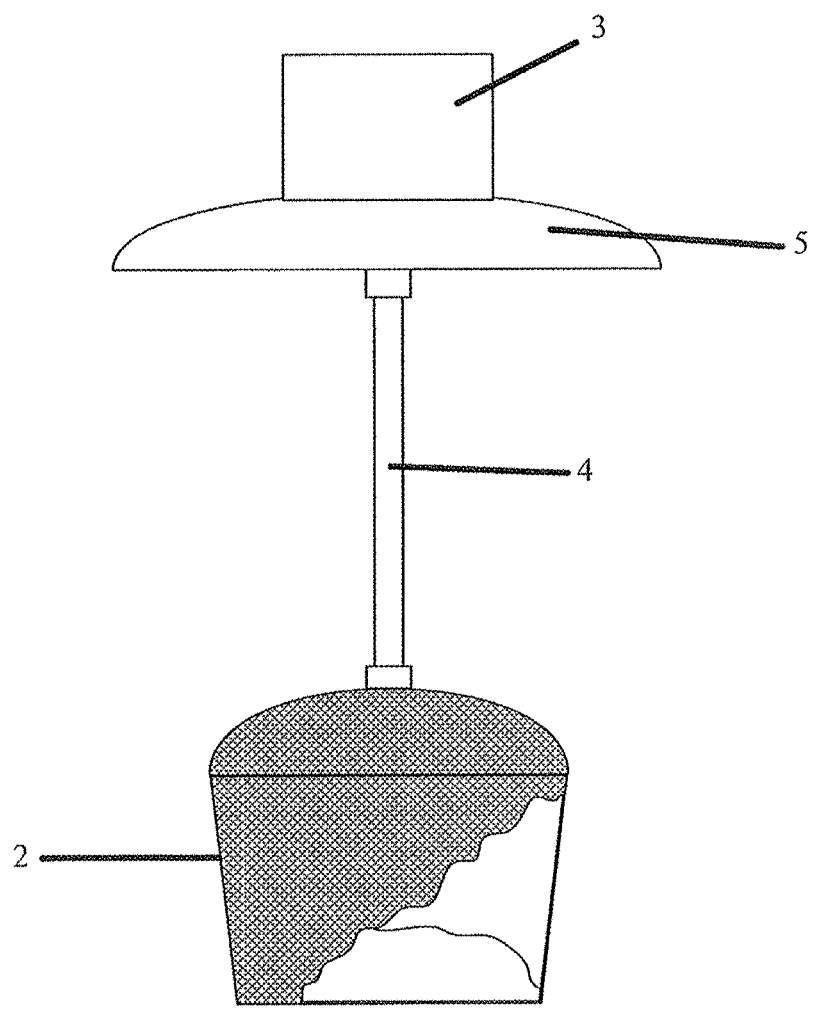
FIG. 2 shows components of the apparatus, including the basket and means for agitating the basket.
Figure 3:
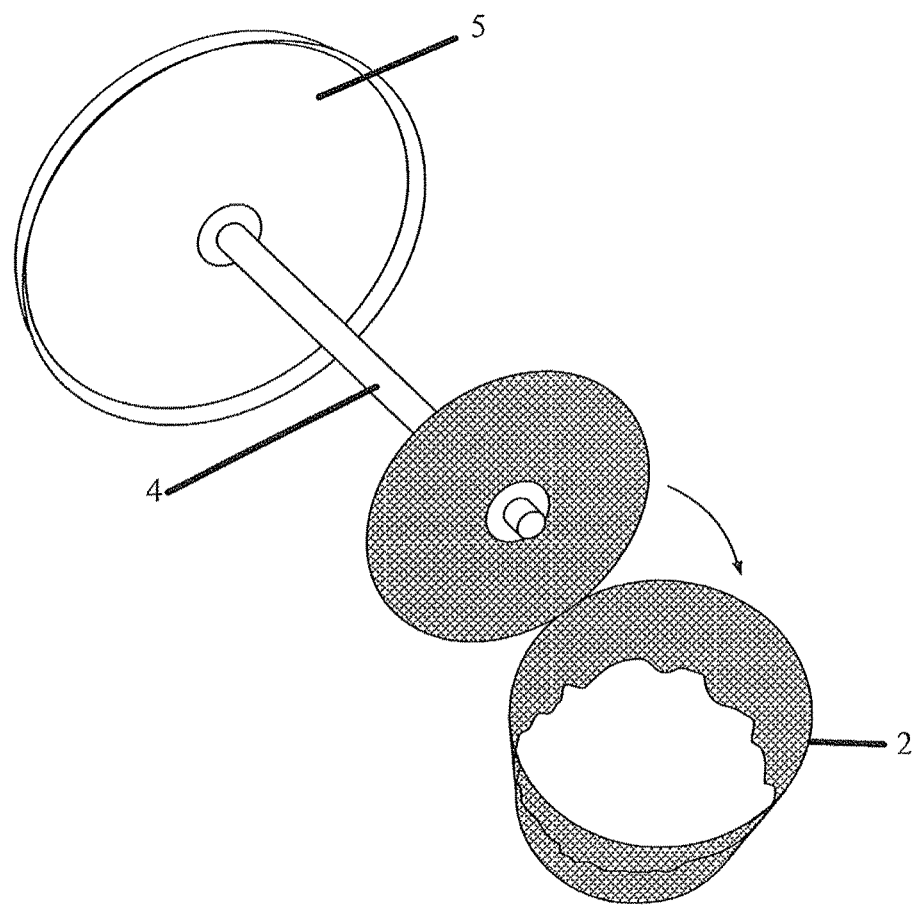
FIG. 3 shows components of the apparatus and how the basket may be opened.
Figure 4:
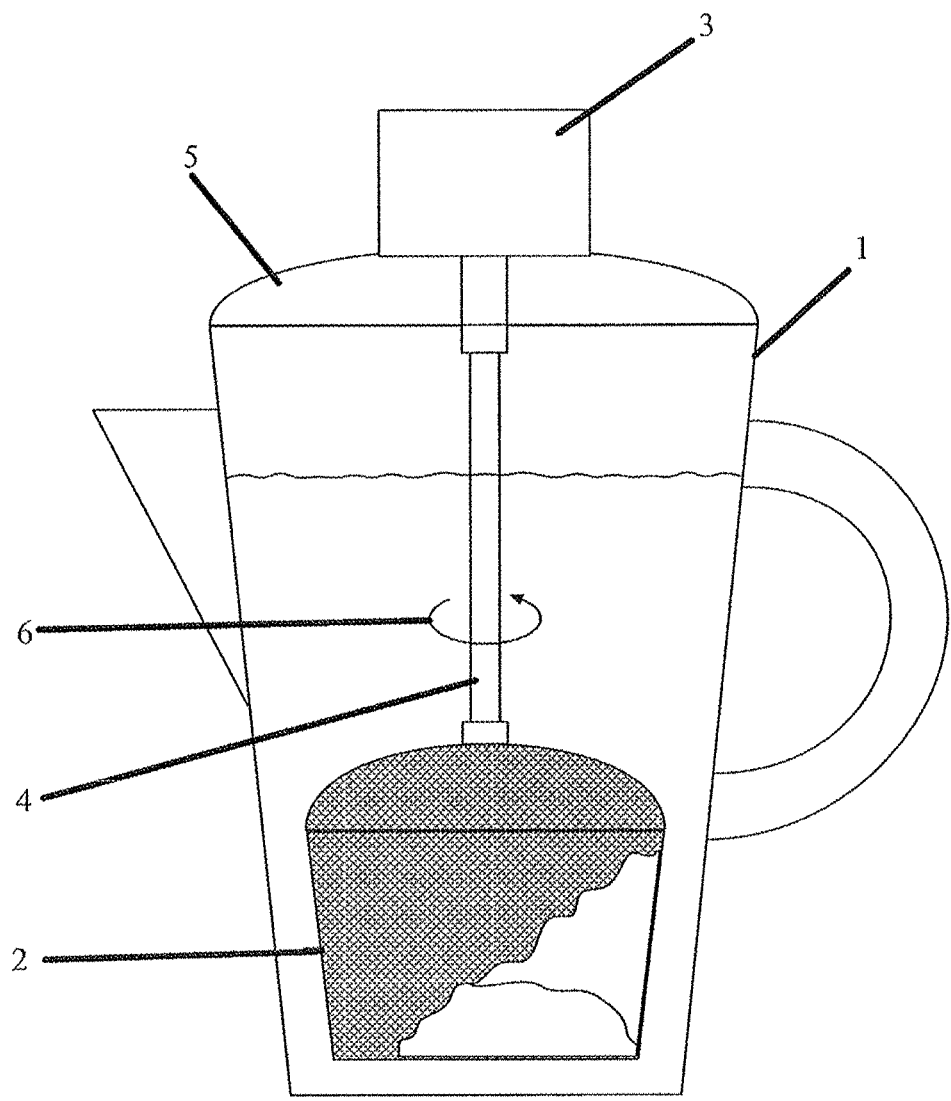
FIG. 4 shows an example of how the components of the apparatus function to achieve agitated infusion.
Figure 5:
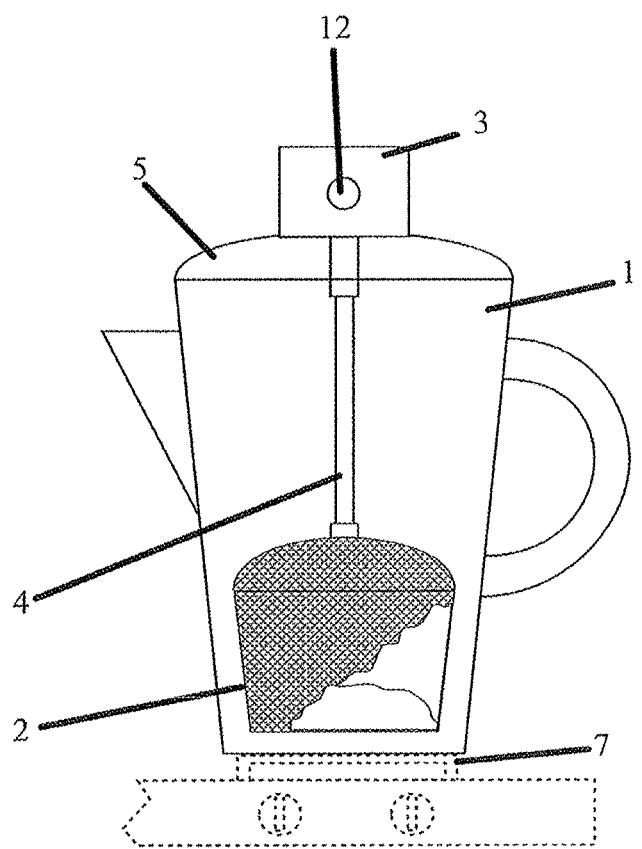
FIG. 5 shows how external heat may be applied to heat water within the apparatus.

Now speaking of the components that comprise the present invention, as shown in FIG. 1, from the outside, the look of the present invention resembles percolator systems currently available. But the components within the present system, which are responsible for brewing the coffee, create a coffee brewing system and method for brewing coffee that are novel to the industry.

Structure Generally

As shown in FIG. 1, the present invention includes a carafe 1 that is similar or identical to the carafe used in a percolator system, a basket 2, and a means for agitating the basket 3. To add water to the carafe, the user merely removes the carafe's lid 5 and pours water therein.

The Basket

The present invention includes a basket 2 into which the user places the packet of coffee grounds. An example of the basket 2 can be seen in several Figures included herewith (for example, FIGS. 1-5). The basket 2 must be manufactured so that a user may insert a packet of coffee grounds into the basket and, when brewing is complete, remove the packet from the basket. Those with skill in the art will recognize that there are numerous ways in which the basket may be manufactured so that the packet 11 can be inserted and removed, and all such numerous ways are considered within the scope of the present invention. Examples of such numerous ways are discussed below and shown in FIGS. 8 and 9.

The basket 2 must also be manufactured such that water may enter the basket and inundate the packet 11. There are numerous methods of manufacturing the basket so that water may enter it to inundate the grounds, and those with skill in the art will recognize that such numerous methods exist (all such numerous methods are considered within the scope of the present invention). In a preferred embodiment shown in FIG. 4 (as well as in other Figures), the basket 2 is comprised of wire mesh that permits water 13 to enter and exit the basket. Other options include but are not limited to fabricating the basket such that it has "holes" or "slits" that permit water to enter the basket to inundate the packet.

In addition, the basket 2 may be manufactured so that it can easily discard the packet 11 and so that the packet pay be easily placed therein. This may be accomplished by numerous methods, all of which are well known in the art and all of which are considered within the scope of the present invention. For example, as shown in FIG. 8, the basket 2 may include a "release latch" 10, whereby when a release latch 10 is pressed, the latch 10 is released and the basket 2 opens. A hook latch may also be used, but this would require the user to manually unfasten the latch, rather than simply pressing a release button. In addition, as shown in FIG. 9, the basket may be manufactured to include a "twist lock." Twist locks are well known in the art; they function such that when one component of an apparatus is inserted into or joined with a second component, and one or both of the components are rotated, the structure of the two components causes the two components to be securely fastened together. Two of the many examples of how twist locks function include threading (similar to the caps of many common bottles of drinking water) or a latching mechanism (such as the release latch mechanism described above).

The basket 2 may be manufactured from a variety of materials and those of skill in the art will recognize suitable materials from which to manufacture the basket. In a preferred embodiment of the invention, the basket is manufactured from stainless steel. Manufacturing the basket from stainless steel is advantageous because the basket will be resistant to corrosion and heat damage, which may otherwise pose problems because the present system heats water within the carafe to a high temperature. In addition, the strength of stainless steel permits the basket to be manufactured with thinner walls than would be possible using other materials, which results in a cost savings, which consumers often prefer.

Agitation

Agitation is the process of churning or otherwise stirring the coffee grounds while water is extracting oil from the grounds. By sufficiently agitating the grounds during the brewing process, all of the grounds being used to brew a given batch of coffee have the opportunity to interact with the water. To achieve the greatest results using the infusion method of brewing coffee, the grounds should be agitated while fully submerged and while the water gradually heats. The Turkish and French Press methods of brewing, discussed above, include (at the user's option) a form of agitation when the user manually stirs the grounds. But as noted above, manually stirring the grounds is highly inconvenient for many users.

The present invention achieves agitation by automatic means that frees the user to perform other tasks while the coffee brews. The present invention does so by agitating the basket 2 within the carafe 1 while the packet 11 is within the basket. There are numerous methods by which one of skill in the art may achieve agitation of the basket 2, and all such methods should be considered within the scope of the present invention. In one embodiment, shown in FIG. 4, the present invention achieves agitation as follows: (i) a motor 3 is affixed to the carafe's lid 5; (ii) the carafe 1 is filled with water 13 (ideally such that the grounds are fully submerged); (iii) the basket 2 is connected to the motor 3; (iv) once the motor 3 is activated, this causes the basket 2 connected to the motor 3 to rotate; (v) the rotating (shown by the arrowed indicated by reference number 6) of the basket 2 through the water 13, which is being gradually heated from tap temperature to approximately boiling, causes the packet within the basket 2 to churn while fully immersed in the gradually heating water, thereby achieving agitation.

In a preferred embodiment of the invention shown in several Figures (including FIG. 4), the basket 2 is connected to the motor 3 via an elongated member 4. The basket 2 is affixed to the bottom end of the member 4 and the top end of the member 4 is affixed to the motor 3. When the motor 3 is activated, the motor causes the elongated member 4 to rotate (see arrow showing rotation indicated by Reference Number 6), which in turn causes the basket 2 affixed to the elongated member 4 to rotate. When the basket 2 spins with the carafe 1 full of heating water 13 and the packet of grounds contained therein, agitated infusion is achieved. However, those with skill in the art will recognize that there are additional methods by which the basket 2 may be connected to a motor 3 such that when the motor is activated agitation is achieved and all such methods should be considered within the scope of the present invention.

Basket Removal

As shown in FIGS. 8 and 9, the present system may be manufactured so that the basket 2 may be removed from the apparatus. Enabling the basket 2 to be removed from the apparatus allows the user to more easily discard the used packet once brewing is complete. Those with skill in the art will recognize that there are numerous means by which the basket may be removed from the apparatus and all such means should be considered within the scope of the present invention. In one possible embodiment (shown in FIG. 4 and discussed supra), the basket 2 connects to the means for agitation by an elongated member 4. In such embodiment, there are numerous means by which the elongated member may be connected to the basket; for example, the basket may be connected to the member via a "universal joint," which is a type of joint well known in the art that allows the basket to be easily disengaged from the member and entirely removed from the system. An additional example of a connection that may be employed is a hooked axle, which also allows the basket to be easily disengaged from the member and entirely removed from the system. These are, however, only two of the many means by which the present invention may be fabricated such that the basket may be removed from the system and all such means are considered within the scope of the present invention.

Heat Application

As explained herein, the water within the chamber must be heated from tap temperature to approximately boiling in order to achieve maximum infusion. However, the heating process must occur relatively quickly because users generally are not willing to wait longer than 6-8 minutes for coffee to brew. If a brewing system takes longer than 6-8 minutes to brew the coffee, many users will opt for a system that brews coffee more quickly.

There are numerous methods by which a person with skill in the art can cause the water within the carafe to heat, and all such methods should be considered within the scope of the present invention. The present invention may include an element for heating or may rely on external heat sources. In an embodiment shown in FIG. 5, the present invention does not include any heating element and relies on an external heat sources 7, such as the heat generated by a user's stove. When using this embodiment of the present invention, the user places the carafe 1 on a stove burner 7 (or other heat source) and adjusts the heat from a stove burner 7 (or other heat source) such that the heat will be sufficient to raise the temperature of the water from tap temperature to approximately boiling.

The apparatus may include a means for monitoring the temperature of the water and alerting the user when the user should reduce or cease applying heat to the apparatus. One such means includes using a thermometer, similar to a meat thermometer or other thermometers, that monitors the heat of the water within the carafe and displays the temperature on the outside of the apparatus. If a thermometer is used, the user must vigilantly monitor the thermometer; possess the knowledge regarding when heat should be removed or reduce; and reduce or remove the heat accordingly.

Figure 6:
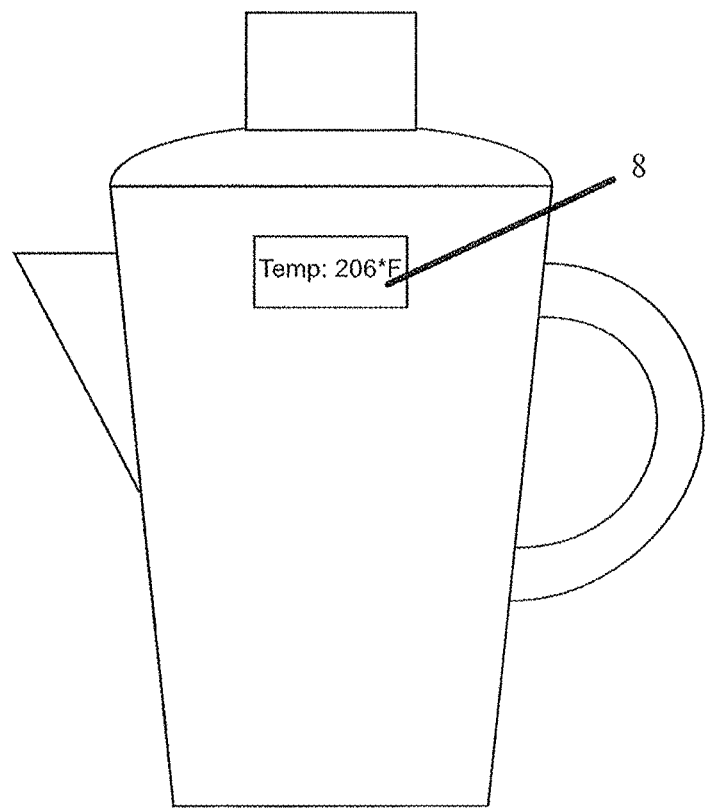
FIG. 6 shows an embodiment of the apparatus that includes a means for displaying the temperature of liquid within the apparatus.
Figure 7:
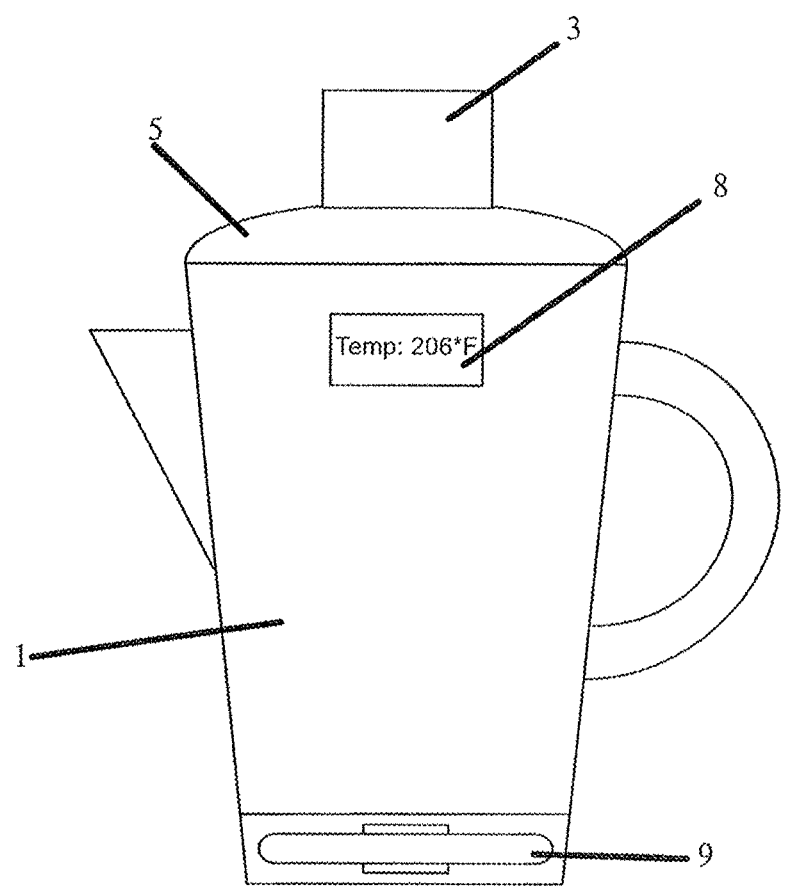
FIG. 7 shows an embodiment of the apparatus that includes a mean for heating liquid within the apparatus.

Other embodiments of the present invention may include electronic means for monitoring the temperature of the water and alerting the user when the user should reduce or cease applying heat to the apparatus (for an example, see Reference Number 8 at FIGS. 6 and 7). There are numerous electronic means that may be used to monitor the temperature of the water within the apparatus that are well known in the art, and all such means are included within the scope of the present invention. Two of the many examples of such well known electronic means include: (i) an electronic interface that is able to receive input from the elements of the apparatus and relay to the user via display, audible alerts, etc, that the heat should be reduced or removed; and (ii) a standard circuit board with electrical wiring to the elements of the apparatus, where such wiring is able to receive input such as temperature readings of the water within the carafe and alert the user that heat should be reduced or removed.

As noted above, other embodiments may include a means for heating liquid that may be present within the carafe. There are numerous methods by which a person with skill in the art can cause the water within the carafe to heat, and all such methods should be considered within the scope of the present invention. In a preferred embodiment shown in FIG. 7, the present invention includes copper coiling 9 that is in contact with the carafe 1. In FIG. 7, the copper coiling 9 is in contact with the bottom of the carafe 1, but the copper coiling may be in contact with any portion of the carafe, so long as the placement of the copper coiling does not interfere with the present system's operation or pose a danger for users (for example, the copper coiling may be placed in contact with the sides of the carafe).

The process of using copper coils to conduct heat is well known in the art. In short, electricity passes through the copper coils, causing them to heat, and the heat of the copper coils is then transferred to the carafe as a result of the coils contacting the carafe's exterior. Once the carafe itself begins to heat, the heat transfers from carafe to the water stored therein. In a preferred embodiment of the present invention, 1200-1500 watts of electricity should be used to heat the water chamber, as this amount of energy will gradually heat the water in the chamber from tap temperature to approximately boiling within the 6-8 minutes time frame in which coffee should be brewed.

In any embodiment of the present invention, the carafe may include material that will prevent a user from touching a portion of the carafe that has become hot once heat is applied. There are numerous methods of prohibiting users from burning themselves by touching hot portions of the carafe and all such means should be included within the scope of the present invention. One such means includes covering portions of the carafe in materials that do not conduct heat (or that conduct heat very poorly). There are numerous polymers that are able to withstand heat but not conduct heat well, and such polymers may be used to cover portions of the carafe to prevent user burns. Another means to prevent user burns includes fabricating the handle of the carafe from material that does not conduct heat.

Activating the Means for Agitation

If the embodiment of the invention that the user is using relies on external heat, then the means for agitating the basket must be activated upon the application of such external heat. In such an embodiment (shown in FIG. 5), the means for agitation 3 may be activated manually, such as by pressing a button or a switch 12. In addition, the means for agitation may be activated by the application of such external heat. Those with skill in the art will recognize that there are numerous means for adapting the means for agitation such that the application of external heat will activate the means for agitating the basket and all such numerous means should be considered within the scope of the present invention. One such means for activating the agitation means upon the application of heat includes electronic means. As described above, the present invention may include an electronic interface that is able to receive input from the elements of the apparatus. Such electronic interface may also be configured to send signals to elements of the apparatus based on the input that it has received from other elements of the apparatus. Thus, the electronic interface may receive input that heat is being applied to the water within the carafe and may then send a signal that activates the means for agitating the basket.

If the embodiment of the present invention includes means for heating the water within the carafe, such as the copper coiling shown in FIG. 7 and described above, then the means for agitating the basket may be activated upon the activation of the apparatus' means for heating the water. Those of skill in the art will recognize how the means for agitating the basket may be adapted to activate upon the activating of the means for heating the water within the carafe. Alternatively, even if the embodiment of the present invention includes a means for heating the water within the carafe, the means for agitating the basket may be activated separately from the means for heating the water. For example, the means for agitating the basket may be activated by a standalone button or switch that must be pressed independently of activating the means for heating the water within the carafe.

The Brewing Process

The process for brewing coffee that is implemented using the present invention has already been described in part above, but for completeness is set forth herein in total. The brewing process includes the following steps:

1) The user accesses the basket 2 and places a packet 11 of coffee grounds therein.

2) The user manually adds water to the carafe 1. Ideally, the amount of water added to the carafe should result in the basket being fully submerged (though this amount of water is not strictly required).

3) If the embodiment of the invention that the user is using relies on external heat, the user then applies such external heat. If the embodiment of the invention that the user is using includes a means for heating the water within the carafe, the user activates the means for heating the water.

4) At the time the water begins to heat, the agitating means begins to agitate the coffee grounds within the gradually heating water.

5) Over the course of 6-8 minutes, the heating means raises the temperature of the water from tap temperature (or another temperature at which water is liquid, but tap temperature is preferred) to approximately boiling and the agitation process occurs throughout the time that the water is heating.

6) Once the heating means has raised the water temperature to approximately boiling, the heating stops (as discussed herein, the heating of the water may be controlled by electronic means or manually). At this point, agitation may continue for an additional 30 seconds to one (1) minute.

7) The brewed coffee that has now been created by the heating of the water and agitation of the packet of coffee grounds may now be poured from the carafe and enjoyed by the user.

If the embodiment of the present invention includes a means for heating the water within the carafe, then the means for heating the water may also keep the coffee warm once the brewing process has completed.

In addition, in embodiments of the invention that include a means for heating the water within the carafe, both the apparatus and the method may be controlled by automated, electronic means. The electronic control means enables a user to vary the settings of the apparatus and how it employs the method in order to brew coffee to suit the user's preference. For example, a user could use the electronic control means to program the apparatus to agitate the grounds for less time during the brewing cycle, resulting in a less robust coffee. Electronic control means allows the entire brewing cycle to run from start to finish without additional action by the user once the user has added coffee and water to the system and has used the electronic control means to configure the brew cycle to suit the user's preference and then has pressed the start button (or similar means for initiating the brewing cycle). There are numerous electronic control means that may be used to control the apparatus and method that are well known in the art, and all such means are included within the scope of the present invention. As noted above, two of the many examples of such well known electronic control means include: (i) an electronic interface that is able to send instructions to and receive input from the elements of the apparatus, thereby enabling the interface to control each element; and (ii) a standard circuit board with electrical wiring to the elements of the apparatus, where such wiring is able to send instructions to and receive input from each element.

Taste Test Studies

Applicant has conducted taste test studies that have overwhelmingly supported Applicant's belief that the method and apparatus disclosed herein produce superior coffee and result in significant cost savings. In one such study, Applicant selected 38 persons for a blind taste test that included coffee brewed using a drip system; a French Press system; a single-serve system; and the method and apparatus disclosed herein. Each system utilized the following amounts of ground coffee to brew the following amount of liquid coffee:

a) The drip filters contained between 3.8 and 4.5 ounces of ground coffee and brewed 10 cups of coffee;

b) The French Press systems contained between 1.1 and 1.4 ounces of ground coffee and brewed 2 cups of coffee;

c) The single-serve systems utilized an industry-standard coffee pod and brewed 1 cup of coffee;

d) The method and apparatus disclosed herein used 2.4 ounces of ground coffee and brewed 10 cups of coffee.

Translating these amounts of ground coffee to cost (all systems utilized a medium Arabica roast, which cost 8.29 per pound [which equals $0.52 per ounce]), the drip had between $1.97 and $2.29 of ground coffee in the basket or $0.20 and $0.23 per cup; the French Press had between $0.57 and $0.73 of ground coffee or $0.29 and $0.37 per cup; the single serve was $0.45 per cup; and the method and apparatus disclosed herein utilized $1.64 of ground coffee or $0.16 per cup.

After each participant tasted and ranked all four types of coffee, 37 out of the 38 participants ranked the method and apparatus disclosed herein as producing the highest quality coffee. The 1 participant that did not rank the method and apparatus disclosed herein as producing the highest quality coffee selected the French Press as producing the best coffee, but ranked the method and apparatus disclosed herein as producing the second highest quality coffee.

Given the success of the method and apparatus disclosed herein, and the amounts of coffee and corresponding costs identified above, the consumers who participated in this study would achieve a cost savings ranging 20% to over 50% per cup if they used the method and apparatus disclosed herein. Over a year's time, that would amount to approximately $150.00 at the lowest savings level or as much as $350.00 at the highest level for one pot per day. This means consumers can drink a better tasting coffee for a significantly lower price.

Application to Other Brewed Beverages

The present invention's primary goal is to provide an apparatus and method to enable consumers to more efficiently and economically brew higher quality coffee than can be brewed using the coffee making systems that are currently available. As such, much discussion of the present invention is framed in terms of brewing coffee. But it should be understood that the present invention may be used to brew other beverages in addition to coffee. For example, as many of the same principles that apply to brewing coffee also apply to brewing tea, a user may utilize the apparatus and method disclosed herein to make tea.

What is claimed is:

1. An apparatus for brewing beverages, comprising:
a receptacle storing a liquid;
a basket for storing coffee grounds, the basket housed within the receptacle,
wherein the basket permits the liquid to enter therein and exit therefrom;
a motor connected to the basket, the motor agitating the basket;

means for heating liquid that is stored within the receptacle;

means for monitoring a temperature of the liquid within the receptacle; and electronic control means operably coupled to the motor, and the means for monitoring the temperature of the liquid within the receptacle, the electronic control means configured to perform processes including:

agitating the basket, via the motor, in response to the liquid in the receptacle being heated;

in response to determining the liquid is heated to approximately a boiling temperature of one:

discontinue heating the liquid stored within the receptacle, or prompting a user to discontinue heating the liquid stored within the receptacle; and maintaining agitation of the basket, via the motor, for a predetermined period of time after determining the liquid is heated to approximately the boiling temperature.

2. The apparatus claimed in claim 1, wherein the basket is optionally removed from and again secured to the apparatus.

3. The apparatus claimed in claim 1, wherein the basket is capable of opening and closing.

4. The apparatus claimed in claim 1, wherein the basket is comprised of stainless steel.

5. The apparatus claimed in claim 1, wherein a handle of the receptacle is comprised of a non-metal material.

6. The apparatus claimed in claim 1, wherein a handle of the receptacle is covered by a non-metal material.

7. The apparatus claimed in claim 1, wherein the means for monitoring the temperature of the liquid within the receptacle includes an electronic interface.

8. The apparatus claimed in claim 1, wherein the means for monitoring the temperature of the liquid within the receptacle is capable of alerting the user when liquid in the receptacle has reached a designated temperature.

9. The apparatus claimed in claim 1, wherein the means for heating liquid that is stored within the receptacle includes copper coils.

10. The apparatus claimed in claim 1, wherein the electronic control means is capable of controlling the means for heating liquid that may be present within the receptacle such that the liquid that may be present within the receptacle may be heated from a beginning temperature of at least 33 degrees Fahrenheit to a maximum temperature of boiling.

11. The apparatus claimed in claim 10, wherein the electronic control means is capable of alerting the user when liquid within the receptacle has reached a designated temperature.

12. The apparatus claimed in claim 11, wherein the electronic control means is capable of regulating the means for heating liquid within the receptacle such that liquid stored in the receptacle may be maintained at a designated temperature.

\* \* \* \* \*